United States Patent [19]

Plasse

[11] Patent Number: 4,773,677

[45] Date of Patent: Sep. 27, 1988

[54] UNITARY LAMINATED IDENTIFICATION CARD AND INSIGNIA

[75] Inventor: Paul A. Plasse, Lexington, Mass.

[73] Assignee: Polaroid Corporation, Cambridge, Mass.

[21] Appl. No.: 50,238

[22] Filed: May 13, 1987

[51] Int. Cl.[4] ........................ G09C 3/02; B42D 15/00; A47G 1/12; B42B 31/00

[52] U.S. Cl. ........................................ 283/77; 283/75; 283/70; 156/293

[58] Field of Search ........................ 283/70, 74, 75, 77, 283/82, 91, 88, 96; 40/1.5, 11 R; 156/293

[56] References Cited

U.S. PATENT DOCUMENTS

| | | | |
|---|---|---|---|
| 2,361,670 | 10/1944 | Whitehead | 40/2.2 |
| 2,983,606 | 5/1961 | Rogers | 96/29 |
| 3,313,052 | 4/1967 | Malster | 40/2.2 |
| 3,758,970 | 8/1973 | Annenberg | 283/82 |
| 3,874,979 | 4/1975 | Hannon | 283/77 |
| 3,931,688 | 1/1976 | Owens | 40/1.5 |
| 3,999,317 | 12/1976 | Owens | 40/1.5 |
| 4,098,014 | 7/1978 | Lauer et al. | 40/1.5 |
| 4,184,700 | 1/1980 | Greenaway | 283/6 |
| 4,305,215 | 12/1981 | Smith | 40/1.5 |
| 4,318,554 | 3/1982 | Anderson et al. | 283/77 |
| 4,330,350 | 5/1982 | Andrews | 156/293 |
| 4,469,725 | 9/1984 | Fischer et al. | 283/75 |
| 4,589,686 | 5/1986 | McGrew | 283/91 |
| 4,629,215 | 12/1986 | Maurer et al. | 283/70 |
| 4,652,015 | 3/1987 | Crane | 283/70 |
| 4,653,775 | 3/1987 | Raphael et al. | 283/108 |

FOREIGN PATENT DOCUMENTS

| | | | |
|---|---|---|---|
| 1269514 | 4/1972 | United Kingdom | 283/77 |

*Primary Examiner*—E. R. Kazenske
*Assistant Examiner*—Paul M. Heyrana, Sr.
*Attorney, Agent, or Firm*—Louis G. Xiarhos

[57] ABSTRACT

There is disclosed a unitary laminated identification card and insignia comprising a lamination including a sheet element carrying photographic information, such as the likeness of the card bearer, a protective plastic sheet member therefor and a relatively thin embossed insignia member having an insignia pattern, the raised portions of the embossed insignia pattern providing an effect of optical dimensionality (depth) visually detectable through a protective plastic sheet member laminated thereto.

6 Claims, 1 Drawing Sheet

UNITARY LAMINATED IDENTIFICATION CARD AND INSIGNIA

BACKGROUND OF THE INVENTION

This invention relates to an identification article and more particularly to a combination identification card and insignia intended to be worn on the person or carried in a wallet or pocket when not used for identification purposes.

Identification cards or badges which carry a photograph or other personalized information pertaining to the bearer are commonplace and have many recognized security and identification applications. Identification cards or badges, which may be worn on the person or carried by the card bearer, are disclosed, for example, in U.S. Pat. No. 2,361,670 (issued Oct. 31, 1944 to N. Whitehead); in U.S. Pat. No. 3,313,052 (issued Apr. 11, 1967 to R. L. Malster); and in U.S. Pat. No. 4,305,215 (issued Dec. 15, 1981 to S. C. Smith).

Various holders for identification cards have been designed to permit the display of the card on the person for identification and security purposes. Examples of credential display holders adapted to display identification data while worn on the person are disclosed, for example, in U.S. Pat. No. 3,931,688 (issued Jan. 13, 1976 to J. C. Owens); in U.S. Pat. No. 3,999,317 (issued Dec. 28, 1976 to J. C. Owens); in U.S. Pat. No. 4,098,014 (issued July 4, 1978 to R. E. Lauer, et al.); and in the previously mentioned U.S. Pat. No. 4,305,215. These holders allow for insertion of an identification credential and display of the card for identification and security purposes. Oftentimes the bearer of an identification card will in addition wear on the person an insignia as a distinguishing honorary mark or mark of office. Private and public officials, such as security guards, investigators, police and military personnel, typically carry an insignia which may be carried or worn on the person. For example, the insignia may be in the form of a relatively rigid spoon-shaped shield element constructed of metal and worn on the person as an official badge and as part of an official uniform or may be simply carried on the person and presented as required for purposes of identification.

In the aforementioned U.S. Pat. No. 3,931,688, there is disclosed a pocket-size combination storage and display case for an insignia member. The display case includes provision for an identification card and the display case can be used to store the insignia member or to display the insignia. Display cases or holders designed to carry an insignia member, such as a security guard's badge, require a particular and elaborate construction in order to conveniently permit storage and display of the insignia. The typical concavo-convex shape and metallic construction of an insignia member add to the bulk and weight of a credential or identification card holder. Moreover, the insignia can be removed from the display case and may pose a security risk in the event the insignia is obtained by an unauthorized person.

SUMMARY OF THE INVENTION

It has been found that a unitary photographic identification card and insignia can be provided in the form of a secure lamination by providing a lamination which includes at least one protective plastic sheet element laminated to a photographic information-bearing record and to a relatively thin embossed insignia member, the raised or bossed portions of the insignia member being visible through a protective plastic sheet element of the lamination and providing a visually detectable dimensionality. According to a product aspect of the present invention, there is, thus, provided a unitary laminated identification card and insignia comprising an element carrying photographic information; a protective plastic sheet material bonded to at least a surface thereof; and a relatively thin embossed insignia member, the bossed portions of the insignia member providing a dimensionality visually detectable through a protective plastic sheet material laminated thereto.

DETAILED DESCRIPTION OF THE INVENTION

As mentioned, the present invention involves the inclusion into a laminated identification card of an embossed insignia member. By integrating the embossed insignia member into the laminated identification (ID) card, certain advantages from a security standpoint are realized. The relief pattern which is characteristic of the boss or raised portions of the embossed insignia member provides an element of optical dimensionality or depth which cannot be duplicated by photographic technique. Valid or authorized issuance of a card bearing an insignia can be readily established by simple inspection and confirmation of the predetermined optical dimensionality. Absence of the effect is indicative of an attempt at counterfeiting and an apparent reproduction of the insignia pattern by printing, photographic or other technique. Integration of the insignia member into an ID card lamination in the form of a relatively thin sheet member substantially reduces the bulk and weight associated with a conventional metallic concavo-convex insignia and eliminates the possibility of an insignia being misplaced. Moreover, removal of the embossed insignia member from the lamination (for purposes of substituting another) cannot be easily accomplished without mutilation of the card or other indication of the attempted alteration. Details and constructions relating to the practice of the invention and other advantages of the invention will be better appreciated from the following detailed description taken in connection with the attached drawings.

Figure 1:
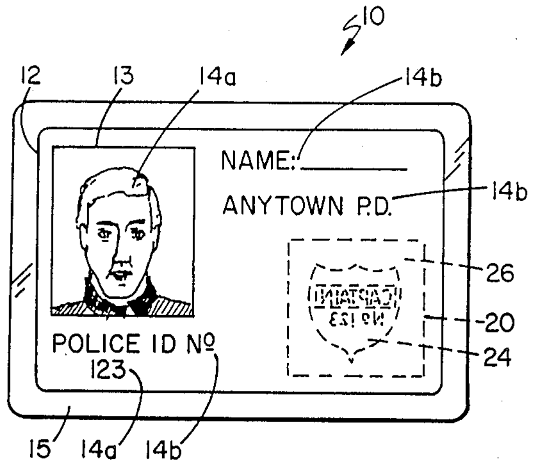
FIG. 1 is a plan view of a laminated photographic identification card carrying an insignia member.

Referring to FIG. 1, there is shown a plan view of a sealed (laminated) ID card of the invention including a photographic record and an embossed insignia member. As shown in FIG. 1, ID card 10 comprises a sheet member 12 carrying personalized indicia 14*a* pertaining to the card holder, printed indicia 14*b* pertaining to the card issuing authority and insignia member 20 bearing an embossed insignia pattern 24. On sheet member 12 is shown a photographic likeness 14*a* of the card bearer. In FIG. 1 is shown a rim 15 which surrounds sheet member 12 as the result of the lamination of sheet element 12 and insignia member 20 between a pair of front and rear protective plastic sheet members having slightly larger dimensions than sheet member 12.

Figure 3:
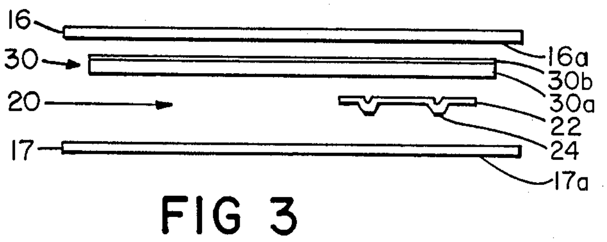
FIG. 3. is a broken apart side view of a laminated identification card having, laminated between protective sheets, a photograph and an embossed insignia.
Figure 4:
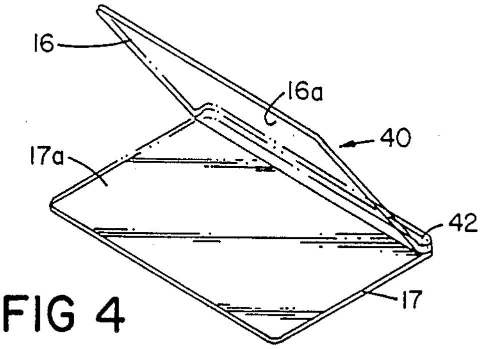
FIG. 4 is a perspective view of a protective plastic pouch or envelope for receiving a photograph and an embossed insignia member for production of a laminated identification card of the invention.

According to one embodiment of the invention, ID card 10 can be prepared by affixing a photograph 13 of the intended card bearer and embossed insignia member 20 in side-by-side relation onto a sheet element 12 of paper, plastic or other suitable substrate material carrying indicia 14*a* and 14*b*, and laminating a sheet of transparent plastic material thereover. Photograph 13 can be prepared by resort to conventional photographic processing methods or by a known instant diffusion transfer method. Sheet element 12 can be protected on one side only using a transparent plastic sheet material, examples of which are described hereinafter. According to a preferred construction, however, a photograph 30 carrying most or all of the desired indicia as photographic information will be sandwiched between a pair of plastic sheet elements, as illustrated in FIG. 3, using a protective envelope or pouch 40, as shown in FIG. 4.

Figure 2:
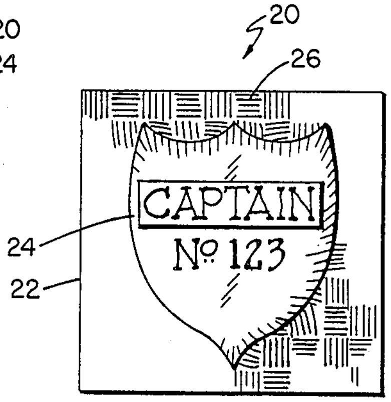
FIG. 2 is a plan view of an insignia member used in the production of a laminated identification card.

In FIG. 2 is shown embossed insignia member 20 which comprises substrate material 22 having an embossed insignia pattern 24 in the form of a shield, crest or like official pattern. Substrate material 22 can comprise any sheet material capable of receiving the desired embossing pattern from a pair of mating embossing dies, as conventionally used in the embossing printing art. Substrate material 22 can comprise a metallic foil material such aluminum foil or plastic foil material carrying a vacuum deposited or sputtered metallic layer. The nature of substrate material 22 is not critical provided that, on lamination of a protective polymeric sheet material thereover, the boss or raised portions of pattern 24 are not reduced so drastically as to eliminate the desired effect of optical dimensionality.

The thickness of substrate material 22 can vary considerable consistent with lamination of embossed member 20 into a sealed identification card having a thickness comparable to conventional ID or credit cards. In general, substrate material 22 will be a relatively thin material, having a thickness in the range of from about 3 mils to about 30 mils (0.076 to 0.76 mm.). It will be appreciated that the relatively thin embossed member 20 can be incorporated into a photographic ID card without substantial increase in the weight of the card. This represents an alternative to the addition of a metallic badge or emblem and the weight associated therewith to an identification credential holder.

The embossed pattern 24 can take any desired form. In some instances, it may be preferred for insignia pattern 24 to have the character of a badge worn by an official. Pattern 24 can, however, take other forms. Examples include official logos, crests, seals and the like.

Preferably insignia pattern 24 will be a metallic or simulated metallic pattern embossed and printed onto a suitable substrate material 22 of paperstock, plastic or like material capable of receiving and retaining the desired embossment. The nature of substrate 22 can vary to present any particular color or background for insignia pattern 24. Substrate material 22 may, for example, be preprinted with a desired pattern in the form of guilloche, filigree or like security printing. In FIG. 2, substrate 22 is shown with printed indicia 26. Security printing methods used in the banknote printing field for fine line printing can be used for this purpose.

A preferred embossed insignia member 20 comprises a relatively stiff paperstock material carrying an insignia pattern having metallic ink at the high points of the embossment. Such a member is shown in FIG. 3 as member 20, comprising substrate material 22 in embossed form carrying pigmented ink material 24 at raised portions of the pattern. Such a pattern can be produced, for example, by inserting a carrier sheet containing a layer of pigmented ink and a substrate material 22 between a pair of embossing dies, embossing under heat, separating the dies and removing the carrier sheet so as to transfer pigmented ink to the raised portions of the embossed substrate material 22. Pattern 24 can, thus, contain reflective metallic or simulated metallic material only at raised portions of the pattern. If desired, however, such ink material can be present over the entire surface of pattern 24. Various patterns can be used depending upon the intended use of the ID card and the desired visual effect to be conveyed by the card.

Printing and embossing equipment, supplies and methods suited to the manufacture of embossed insignia member 20 are known in the printing art. While such methods are known and commercially practiced, the manufacture of an embossed insignia member useful herein requires that dies corresponding to the desired insignia pattern be first manufactured. The required manufacture of embossing/printing dies represents in part a deterrent to some would-be counterfeitors and provides in part an element of security to the ID cards of the present invention.

In ID card 10 of FIG. 1, insignia member 20 and photographic likeness 14*a* are shown on the same side of the card. A preferred arrangment includes a photographic record viewable from one side of the card and the insignia member viewable from the opposed side. It will be appreciated that placement of the insignia member on the side opposed from the photographic information allows either or both of the photographic likeness and the insignia to be of a size larger than can be accommodated on the same side of a card which may typically have dimensions suitable for carrying of the card in a wallet. Such an arrangement is shown in FIG. 3 which shows a broken apart side view of an ID card of the invention.

Referring to FIG. 3, there is shown a pair of outer protective sheet members 16 and 17 which in the finished lamination serve to protect photograph 30 and insignia member 20 against wear or abrasion or attempted alterations. As shown in FIG. 3, the dimensions of protective sheet members 16 and 17 are slightly larger than photograph 30 to provide a plastic-to-plastic lamination. Lamination of the card elements can be secured by adhesive material (not shown) on each of sheets 16 and 17, on surfaces 16*a* and 17*a*. On lamination, the bonding together of sheets 16 and 17 through their respective adhesive layers provides a rim or border (15) as shown in FIG. 1. In FIG. 3, photograph 30 is shown as a photographic print comprising a support member 30*a* carrying a photographic record-containing (image) layer 30*b*. The photographic information in layer 30*b* can be viewed through transparent layer 16. Insignia member 20 is shown on the side opposed from photographic print 30.

Embossed insignia member 20 is positioned such that the raised portions or bosses thereof and the effect of optical depth can be seen through transparent sheet member 17. The raised portions of insignia member 20 are shown carrying areas 24 of pigmented metallic ink which preferably is provided during the embossment step used in the production of insignia member 20.

As mentioned previously, a convenient means of preparing an identification card of the invention involves the preparation of a photograph 30 carrying desired indicia in a single layer thereof and lamination of the photograph, along with embossed insignia member 20, between a pair of protective sheet elements. The photograph will typically be a photographic print 30 comprising, as shown in FIG. 3, a support sheet member 30*a* and a photographic information-containing layer 30*b*. Photographic print 30 can be prepared by any of the known photographic techniques and the method of preparation per se comprises no part of this invention. Since it is, of course, preferable that the photo system employed be such that the subject or bearer can be photographed and the card prepared and issued on the spot, the preferred system for preparing the photograph utilizes principles of photography known as diffusion transfer to obtain either black-and-white or color photos, as the case may be. Most preferred are color images and these may be obtained, for example, in accordance with the procedures described in U.S. Pat. No. 2,983,606.

A particularly useful system for preparing the photo utilizes diffusion transfer photographic principles such as the color system described in the aforementioned U.S. patent to provide a photo of the bearer along with descriptive information in the camera so that both the subject and the descriptive matter are simultaneously photographed to provide a single developable image. The developable image is then processed to provide a transfer print comprising a suitable support having thereon an image-bearing layer containing a likeness of the subject at one portion thereof and the descriptive matter at another portion thereof.

Commercial "instant" or "on-the-spot" ID card issuance systems can be employed to provide an ID card for immediate use. Such systems are typically based on color photographs from diffusion transfer photographic film units. Thus, the intended bearer of an ID card will report to an ID card issuance station where appropriate photographic materials and equipment are assembled. A data card containing personalized information relating to the bearer is prepared, usually by adding such information to a preprinted data card bearing information pertaining to the card issuing authority or association. The data card and the bearer are photographed simultaneously with a camera unit employing diffusion transfer photographic film (comprising a photosensitive element, an image receiving element and a rupturable pod containing photographic processing composition for distribution between such elements after photoexposure). The preparation of a photographic print in the aforedescribed manner can be accomplished most expeditiously using a Polaroid ID-3 Land Identification System equipped with a diffusion transfer color film unit available from Polaroid Corporation under the trademark designation Polacolor 2. As mentioned previously, however, other methods for preparing photographic information-bearing cards can be used.

In forming an ID card of the invention, a preferred method is to laminate a photograph 30 and an insignia member 20 between two sheets of protective plastic material, although as indicated previously, a single sheet can be used to protect the photograph and the insignia member if they are place in side-by-side relation as shown in FIG. 1. A favored structure for fully protecting the front and rear surfaces of an ID photograph comprises an envelope-type pouch such as shown in FIG. 4. In pouch 40, is shown front plastic sheet member 16 which is coupled to rear plastic sheet member 17 along edge 42, usually by an adhesive bond. Pouch 40 will typically have dimensions slightly greater than those of the ID photograph, so that the peripheral edges of the front and rear protective members can be sealed together during a heat and/or pressure lamination. Preferred materials for use as protective sheet members 16 and 17 include rigid or semirigid vinyl, e.g., the polyvinyl chloride or polyvinyl chloride/polyvinyl acetate copolymers known in the art. Polyester and other sheet materials can also be employed.

The thickness of layers 16 and 17 can vary as is known in the field of ID cards. For example, sheets having a thickness in the range of from about one to about 10 mils (0.025 mm to 0.25 mm.) can be suitably employed. Sheets 16 and 17 can be of the same or different thickness. Preferably, however, layer 16 or 17 facing the embossed insignia member will be sufficiently thin as to permit the embossment thereof to be sensed tactilely and to allow the dimensionality of the embossment to be viewed therethrough.

Inner surface 16*a* of sheet member 16 (and inner surface 17*a* of sheet member 17) will be comprised of adhesive material (not shown) to effect proper adhesion of these members to the ID photograph. The adhesive materials on these members can be the same or different. A preferred pouch structure includes heat-activatable adhesive (such as ethylene/ethyl acrylate copolymer) on the inner surface of sheet members 16 and 17, and additionally over such adhesive material on front member 16, a layer of a mixture of polyvinyl alcohol and poly-4-vinyl pyridine. This mixture provides an excellent security seal between the moist surface of a diffusion transfer photograph and the sheet member 16 upon lamination.

Following the positioning of ID photograph 30 and insignia member 20 between the protective sheet elements of pouch 40 (FIG. 3), the structure can be laminated, as by heat sealing to provide a finished ID card showing photograpic indicia on one side and the embossed insignia on the other side of the card.

While a preferred ID card structure is shown in FIG. 3 and is conveniently provided by using a plastic pouch or envelope as shown in FIG. 4, other structures can be employed. Thus, there can be used, for example, an envelope structure comprising front and rear protective sheet components sandwiching a frame member having a well opening suitable to accommodate a photographic print of the type hereinbefore described. Such an envelope structure is described in U.S. Pat. No. 4,330,350 (issued May 18, 1982 to P. A. Andrews) and can accommodate an embossed insignia member to provide an ID card of the present invention.

As indicated previously, a preferred insignia member comprises an insignia pattern having pigmented ink on the bosses thereof. Lamination of a protective sheet thereover provides a security feature in that an attempt to remove the protective sheet therefrom results in a destruction of the pattern, particularly by removal of ink material from the bosses and adhesion of ink portions to the separated protective sheet. Other security features can, however, be included in the card. For example, reverse printing of indicia on the adhesive material applied to surfaces 16*a* and 17*a* of envelope 40 can be used for viewing thereof through transparent protective sheet layers 16 and 17, respectively. Examples of security features that can be used to augment the security of the ID card of the present invention are described, for example, in U.S. Pat. No. 4,653,775 (issued Mar. 31, 1987 to T. Raphael, et al.).

Modifications may be made in detail of the above description of the invention without departing from the spirit and scope of the invention defined in the appended claims. Accordingly, it is intended that all matter contained in the above description or shown in the accompanying drawings be interpreted as illustrative and not limiting in nature.

What is claimed is:

1. A unitary identification card and insignia laminate comprising a lamination, between a pair of outer protective plastic sheet members, of a sheet element carrying photographic information, and an embossed insignia member, said sheet element carrying said photographic information being viewable from one side of said laminate and said embossed insignia member being viewable from the opposed side of said laminate, said embossed insignia element comprising a relatively thin substrate material having an official insignia pattern embossed therein by embossing said substrate material between a pair of embossing dies, one of said pair of outer protective plastic sheet members being laminated to said sheet element carrying said photographic information and the second of said pair of outer protective sheet members being laminated to said embossed insignia member, the raised portions of the embossed insignia pattern providing an effect of optical dimensionality visually detectable through said outer protective plastic sheet member laminated thereto.

2. The unitary identification card and insignia laminate of claim 1 wherein said sheet element carrying said photographic information comprises a diffusion transfer photographic print.

3. The unitary identification card and insignia laminate of claim 2 wherein said photographic information includes a likeness of the card bearer and personalized indicia pertaining to the bearer.

4. The unitary identification card and insignia laminate of claim 3 wherein said relatively thin substrate material comprises paper and wherein raised portions of the embossed pattern carry pigmented metallic or simulated metallic ink.

5. The unitary identification card and insignia laminate of claim 3 wherein each of the outer protective plastic sheet elements is laminated with adhesive to the respective diffusion transfer photographic print and embossed insignia member.

6. The unitary identification card and insignia laminate of claim 3 wherein the dimensions of said outer protective sheet members are slightly greater than those of said diffusion transfer photographic print and the peripheral portions of said protective plastic sheet members are sealed together by lamination.

* * * * *